No. 858,696. PATENTED JULY 2, 1907.
A. M. ANDERSON & C. QUESNELL.
HARVESTING MACHINERY OF THE COMBINED REAPING AND THRESHING TYPE.
APPLICATION FILED MAY 25, 1905.

4 SHEETS—SHEET 1.

Andrew M. Anderson
Cornelius Quesnell
INVENTORS

WITNESSES:

By C. A. Snow & Co.,
ATTORNEYS

No. 858,696. PATENTED JULY 2, 1907.
A. M. ANDERSON & C. QUESNELL.
HARVESTING MACHINERY OF THE COMBINED REAPING AND THRESHING TYPE.
APPLICATION FILED MAY 25, 1905.
4 SHEETS—SHEET 3.

WITNESSES:

INVENTORS
Andrew M. Anderson
Cornelius Quesnell
By C. A. Snow & Co.
ATTORNEYS

No. 858,696. PATENTED JULY 2, 1907.
A. M. ANDERSON & C. QUESNELL.
HARVESTING MACHINERY OF THE COMBINED REAPING AND THRESHING TYPE.
APPLICATION FILED MAY 25, 1905.
4 SHEETS—SHEET 4.
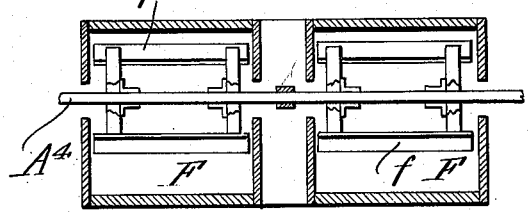
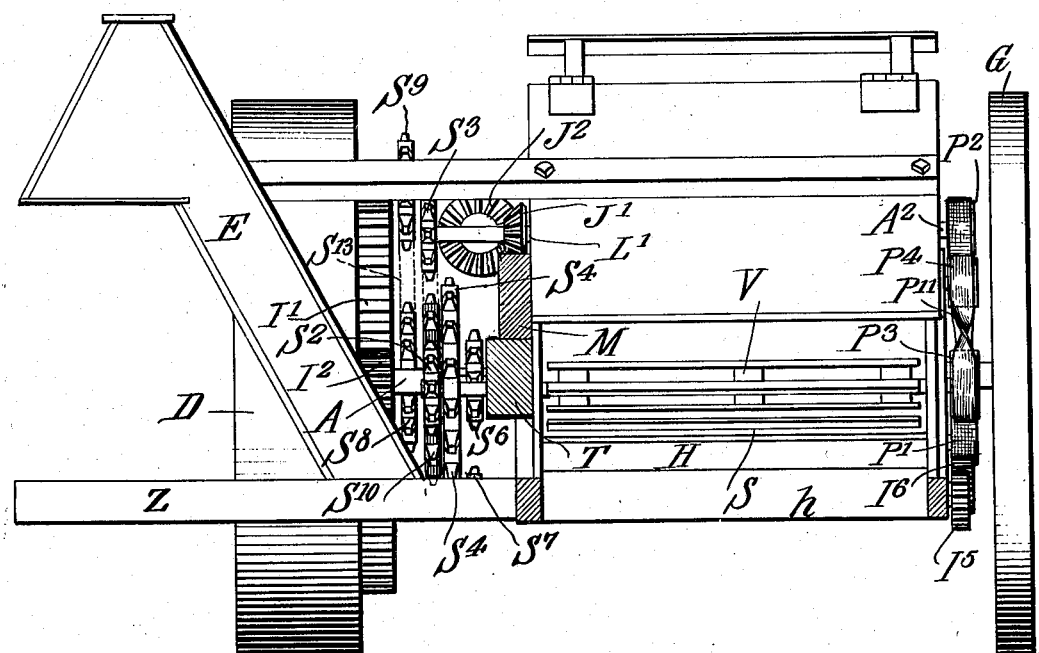
Andrew M. Anderson
Cornelius Quesnell
INVENTORS
WITNESSES:
By
ATTORNEYS

UNITED STATES PATENT OFFICE.

ANDREW M. ANDERSON AND CORNELIUS QUESNELL, OF MOSCOW, IDAHO.

HARVESTING MACHINERY OF THE COMBINED REAPING AND THRESHING TYPE.

No. 858,696.  Specification of Letters Patent.  Patented July 2, 1907.

Application filed May 25, 1905. Serial No. 262,275.

*To all whom it may concern:*

Be it known that we, ANDREW M. ANDERSON and CORNELIUS QUESNELL, citizens of the United States, residing at Moscow, in the county of Latah and State of Idaho, have invented new and useful Improvements in Combined Harvesting and Threshing Machines, of which the following is a specification.

Our invention pertains to combined harvesting and threshing machines; and it has for one of its objects to provide a machine of this character having cutting mechanism of the same width as the threshing mechanism whereby grain may be cut and fed to the threshing mechanism without danger of clogging the machine.

Another object of the invention is the provision of a combined harvesting and threshing machine which is generally of high efficiency, is adapted to be properly worked with but little effort on the part of or attention from the operators, and embodies no weak parts such as are likely to get out of order after a short period of use.

Figure 1:
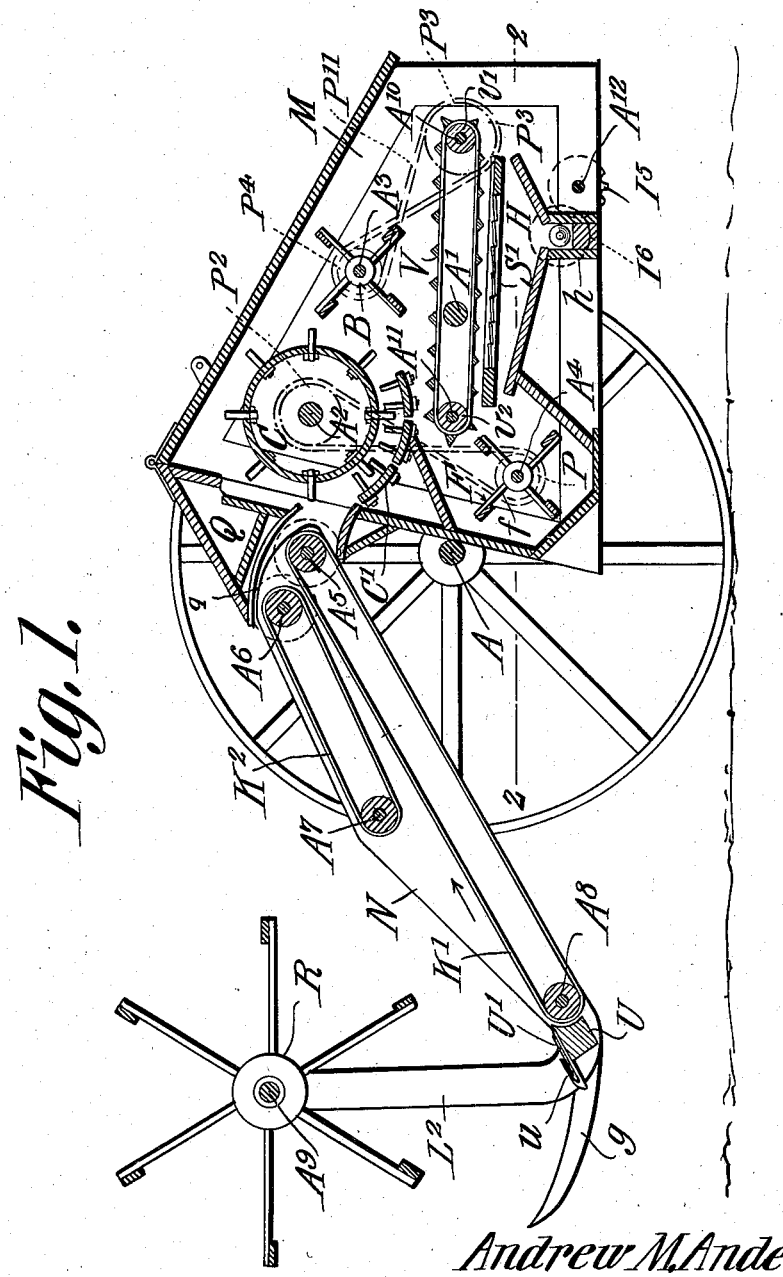
Figure 2:
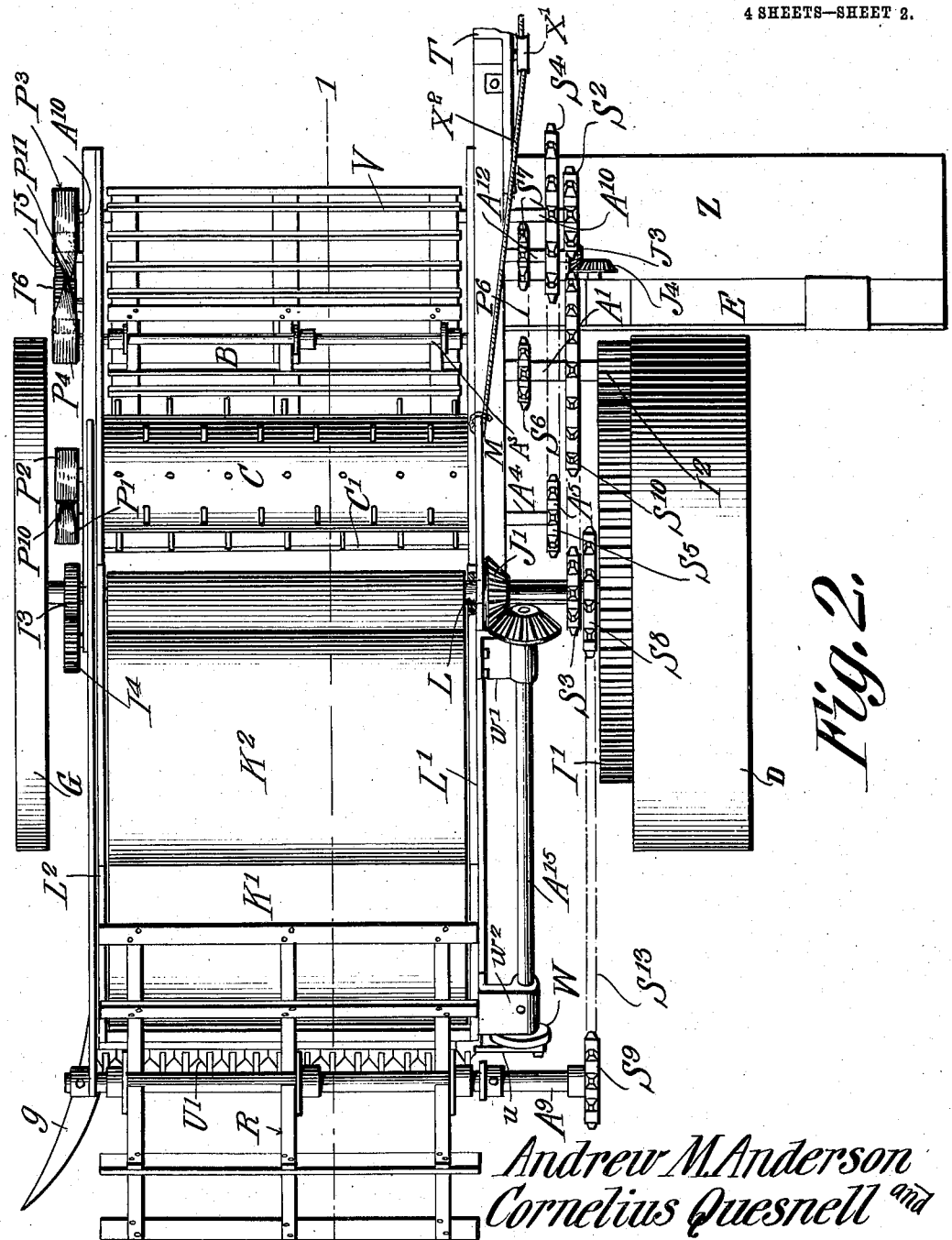
Figure 3:
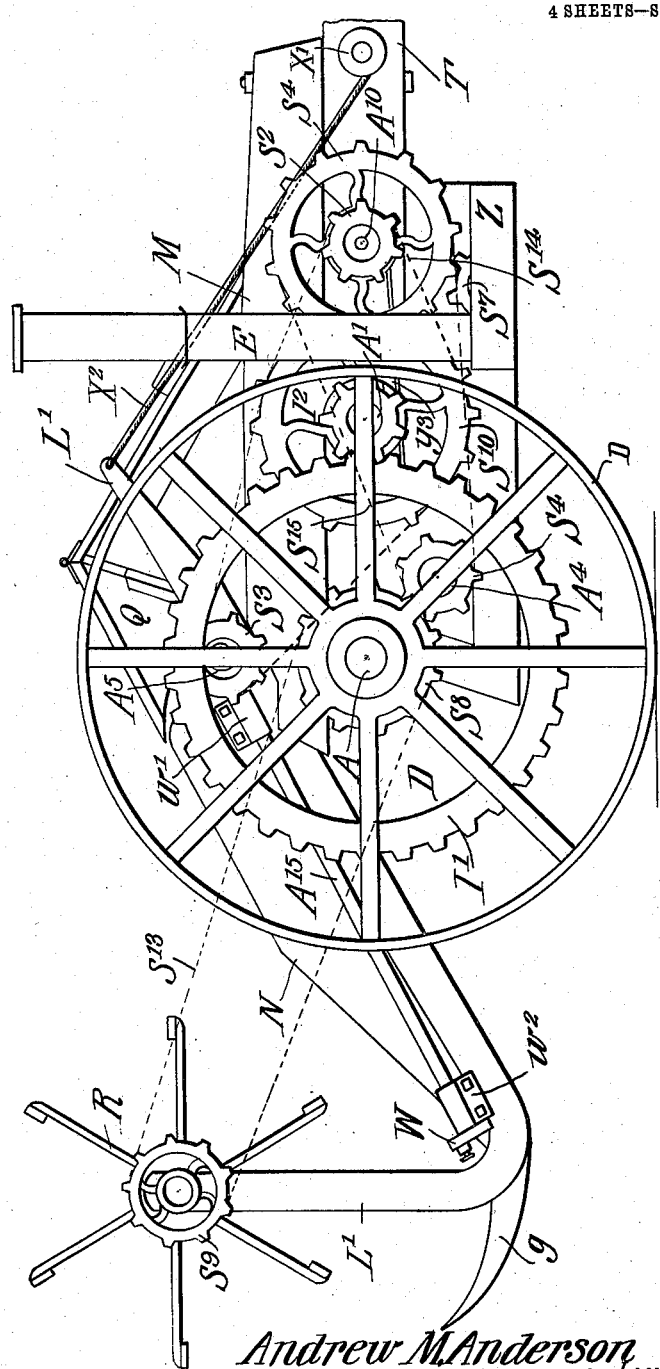

Other objects and advantages of the invention will be fully understood from the following description and claims when the same are read in connection with the accompanying drawings, forming part of this specification, in which:

Figure 1 is a longitudinal, vertical section of the machine constituting the present and preferred embodiment of our invention; the same being taken in the plane indicated by the line 1—1 of Fig. 2. Fig. 2 is a top plan view of the machine. Fig. 3 is a side elevation of the machine, a portion of the adjusting mechanism of the harvester being removed. Fig. 4 is a rear elevation of the machine, and: Fig. 5 is a detail transverse section illustrating a preferred arrangement of fans and fan chambers hereinafter referred to.

Similar letters designate corresponding parts in all of the views of the drawings, referring to which:

A is an axle having fixed on one of its ends a drive wheel D and loosely mounted on its opposite end a grain wheel G.

M is a main frame, preferably in the form of a casing, mounted on the axle A and designed to contain the threshing mechanism presently described.

T is a rearwardly extending tongue bolted or otherwise fixed to the main frame M, Figs. 2 and 3, and designed to be supported at its rear end by the usual steering wheel (not shown).

N is a vertically swinging sub-frame pivoted at L to the main frame M, and designed to carry the cutting mechanism, hereinafter set forth, as well as the means for conveying the cut grain to the threshing mechanism.

$L^1 L^1$ are bars fixed to opposite sides of the sub-frame N and extending rearwardly beyond said sub-frame, Figs. 2 and 3, and terminating at their forward ends in upwardly extending arms designed to support the reel R of the harvesting mechanism.

$g$ is the usual grain divider carried at the forward end of the sub-frame N.

U is a sickle bar also carried at the forward end of the sub-frame N and arranged below the usual sickle $U^1$ and in guards $u$.

$K^1$ $K^2$ are drapers mounted on rollers carried by shafts $A^5$, $A^6$, $A^7$ and $A^8$ in the sub-frame N.

$A^1$ is a transverse shaft journaled in the main frame N and bearing spools $X^1$.

The arms $L^1$ are adapted to be adjusted by actuating mechanism which constitutes the subject matter of a separate application, Serial No. 328,140, and embodies an arrangement of suitably connected cables $X^2$ and X, the cables X being extended under suitably arranged spools $X^1$. In Fig. 3 of the drawings has been shown only a portion of the adjusted mechanism which may be used.

The reel R on sub-frame N is designed to be rotated from the axle A through a sprocket gear $S^8$ fixed on the axle, a sprocket gear $S^9$ fixed on the reel shaft, and a sprocket belt $S^{13}$ connecting the gears $S^8$ and $S^9$, which belt we have shown in dotted lines, while the sickle $U^1$ is reciprocated from the draper shaft $A^5$ through the miter gear $J^1$ fixed on said shaft, a longitudinal, inclined shaft $A^{15}$ journaled in suitable bearings $W^1$ $W^2$ on the sub-frame N and having a miter gear $J^2$ at its rear end, intermeshed with the gear $J^1$, and a crank disk W at its forward end, and a pitman $u$ connecting said crank disk W and the sickle $U^1$. The said draper shaft $A^5$ is rotated from the drive wheel D, through the spur gear $I^1$ fixed to said wheel, a spur gear $I^2$ loosely mounted on shaft $A^1$ and intermeshed with the spur gear $I^1$, a sprocket wheel $S^{10}$ fixed to the gear $I^2$, a sprocket wheel $S^3$ fixed on the shaft $A^5$, and a sprocket belt $S^{14}$ connecting the sprocket wheels $S^{10}$ and $S^3$ which sprocket belt we also have shown in dotted lines.

From the foregoing it follows that the draper $K^1$ is positively driven in the direction indicated by arrow in Fig. 1; and in order to similarly drive the draper $K^2$ we provide the gearing shown at the right of Fig. 2, viz: the spur gear $I^3$ fixed on shaft $A^6$ and the intermeshed spur gear $I^4$ fixed on the shaft $A^6$. Being positively driven as stated, the drapers are obviously adapted to forcibly feed the cut grain upwardly and rearwardly.

Q, Fig. 1, is a hood or grain deflector hinged to the top of the main frame M, and having a concave face $q$ for guiding the grain as the same is forcibly fed upwardly and rearwardly by the drapers.

C is a threshing cylinder, of the conventional or any other suitable construction, arranged in the main frame M in rear of the deflector Q and on a transverse shaft $A^2$ journaled in said main frame, and $C^1$ is the concave complementary to said cylinder. As best shown in Fig. 1, the said concave C¹ comprises a plurality of sections, the foremost section being blank or plain and placed in an inverted position so as to steer the grain between the cylinder and concave, the next two sections toward the rear being made solid to prevent the grain from falling and being each provided with rows of teeth, and the rearmost section being similarly toothed and being provided with perforations designed to permit the grain to fall through.

In addition to the cylinder C and the concave C¹, the threshing mechanism of our improved machine comprises a beater B carried by a shaft $A^3$, an endless straw carrier V mounted on rollers $V^1$ $V^2$ carried by shafts $A^{10}$, $A^{11}$, Fig. 1, a sieve $S^1$ arranged in a frame S a hopper H communicating with a grain trough $h$, a conveyer $a$ working in the trough $h$ and designed to carry the grain to an elevator E, Figs. 2, 3 and 4, fan chambers F, Figs. 1 and 5, and fans $f$ arranged in said chambers and carried by a shaft $A^4$.

All of the parts of the threshing mechanism are relatively arranged as shown, and two fan chambers F and fans $f$ at opposite sides of the longitudinal center of the machine are preferably employed because of the considerable width of the machine.

The before mentioned sprocket wheel $S^2$ is fixed on the shaft $A^{10}$ of straw carrier V and hence it will be apparent that the straw carrier will be driven from the wheel D. The shaft $A^{10}$ bears another sprocket wheel $S^4$ connected by belt $S^{15}$, see dotted lines in Fig. 3, with a sprocket wheel $S^5$ fixed on the fan shaft $A^4$ so as to drive the fans. On the right hand end of fan shaft $A^4$ is fixed a pulley $P'$, connected by a crossed band $P^{10}$, see dotted lines in Fig. 2, with a pulley $P^2$ fixed on the cylinder shaft $A^2$, whereby it will be seen that cylinder C will be rotated in the proper direction. On the same end of the shaft $A^{10}$ of straw carrier V is fixed a pulley $P^3$ connected by a crossed belt $P^{11}$, see dotted lines, with a pulley $P^4$ fixed on the shaft $A^3$ so as to rotate beater B in the proper diirection; said beater serving to act on the grain as it passes from between the cylinder and concave and force the straw down on the carrier V and toward the rear with a view of preventing the straw gathering in the space in rear of the cylinder and thereby clogging the mechanism.

Rotatable with the sprocket wheel $S^{10}$ is a sprocket wheel $S^6$, Fig. 2, connected by belt $P^{16}$, see dotted lines, with a sprocket wheel $S^7$ which latter is fixed on a shaft $A^{12}$ having fixed on its opposite end a spur gear $I^5$ intermeshed with a spur gear $I^6$ secured to the conveyer $a$. The shaft $A^{12}$ also carries a miter gear $J^3$ intermeshed with a similar gear $J^4$ for operating the elevator E.

When desired the straw-carrier shaft $A^{10}$ may be equipped with eccentrics (not shown) for operating shaker arms secured at one end to a bar in turn secured to the frame S which is thus given a vibratory movement; said frame being supposed to be supported at its rear by springs (not shown).

During the operation of the machine, the straw is discharged from the rear end of the casing-like main frame M while the grain is sacked by an attendant who stands on the platform Z, Fig. 2.

It will be noted by referring to Fig. 2 that the threshing cylinder and the concave co-operating therewith are of the same length as the cutting apparatus. Considerable importance is attached to this feature because the material can be fed directly from the cutting mechanism to the thresher without necessitating the employment of any means for bundling it or reducing the extent thereof in order that it may be fed to the threshing apparatus.

We have entered into a detailed description of the construction and relative arrangement of the parts comprised in the present and preferred embodiment of our invention in order to impart a full, clear, and exact understanding of the said embodiment.

We do not desire, however, to be understood as confining ourselves to the said specific construction and relative arrangement of parts as such changes or modifications may be made in practice as fairly fall within the scope of our invention as claimed.

Having described our invention, what we claim and desire to secure by Letters-Patent, is:

1. In a combined harvesting and threshing machine, the combination of a wheel-supported main frame, a vertically swinging sub-frame arranged in front of and pivoted to the main frame, and having side bars extending rearwardly of the pivot and terminating at their forward ends in upright arms, a reel mounted in said arms, a cutting mechanism carried at the forward end of the sub-frame, a drive wheel, driving connections intermediate said drive wheel and the reel and cutting mechanism, and means on the main frame and connected with the rearwardly extended portions of the side bars of the sub-frame for raising the forward portion of said sub-frame.

2. In a combined harvesting and threshing machine, the combination of a wheel-supported main frame, a vertically swinging sub-frame arranged in front of and pivoted to the main frame, and having side bars extending rearwardly of the pivot and terminating at their forward ends in upright arms, a reel mounted in said arms, a cutting mechanism carried at the forward end of the sub-frame, a drive wheel, a transverse shaft, a driving connection between the drive wheel and said shaft; a driving connection between said shaft and the reel, and a longitudinal shaft carried by the sub-frame and connected with the said shaft and also connected with the cutting mechanism.

3. In a combined harvesting and threshing machine the combination with a wheel supported frame having an inlet opening throughout the width thereof, and threshing mechanism extending throughout the width of said opening; of a sub-frame adjustably connected to and extending forward from the wheel supported frame, straw cutting mechanism carried by and movable with the sub-frame, said mechanism being of the same width as the threshing mechanism, a reel carried by the sub-frame, and movable therewith and means for conveying cut material from the cutting mechanism to the inlet opening, said conveying means being of the same width as the cutting and threshing mechanism.

4. The combination with a threshing machine having an inlet opening extending throughout the width thereof, a shaft journaled upon the machine, and means for actuating said shaft; of a sub-frame extending in front of the threshing machine and pivotally mounted upon said shaft, a power transmitting device upon the sub-frame and operatively connected to the pivot shaft, a sickle upon the sub-frame, means operated by said power transmitting device for reciprocating the sickle, a reel carried by the sub-frame and above the sickle, means operated by the pivot shaft for actuating the reel, and means for swinging the sub-frame upon the pivot shaft independently of the operation of the sickle and reel.

5. The combination with a threshing machine having a shaft thereon and mechanism for actuating the shaft, said machine having an inlet opening extending throughout the width thereof; of a sub-frame pivotally mounted upon the shaft, a draper upon said sub-frame, a sickle carried by the sub-frame, independent mechanism operated by the pivot shaft for actuating the draper and sickle, a reel above and supported by the sub-frame, mechanism operated by the pivot shaft for actuating the reel, and means for swinging the sub-frame upon the pivot shaft without interfering with the operation of the reel, sickle and draper actuating mechanisms, said sickle and draper being of the same or less width than the threshing mechanism.

6. In a combined harvesting and threshing machine the combination with a wheel supported main frame and threshing mechanism carried thereby; of a vertically swinging sub-frame arranged in front of and pivoted to the main frame and having side bars terminating at their forward ends in upright arms, a reel mounted in said arms, a cutting mechanism carried at the forward end of the sub-frame, said mechanism being of the same width as or less width than the threshing mechanism, means of the same width as the cutting mechanism for conveying cut material upon the sub-frame and to the threshing mechanism, a drive wheel, driving connections intermediate said drive wheel and the reel, conveying means and cutting mechanism, and means on the main frame and connected with the sub-frame for raising the forward portion of said sub-frame.

ANDREW M. ANDERSON.
CORNELIUS QUESNELL.

Witnesses:
 GEO. F. ALBRIGHT,
 JNO. J. ANTHONY.